May 22, 1956 C. E. TACK 2,746,572
ROTOR BRAKE

Original Filed July 13, 1949 2 Sheets-Sheet 1

INVENTOR.
BY CARL E. TACK

May 22, 1956  C. E. TACK  2,746,572
ROTOR BRAKE

Original Filed July 13, 1949  2 Sheets-Sheet 2

INVENTOR.
BY CARL E. TACK
Atty.

United States Patent Office 2,746,572
Patented May 22, 1956

2,746,572
ROTOR BRAKE

Carl E. Tack, Chicago, Ill., assignor to American Steel Foundries, Chicago, Ill., a corporation of New Jersey Original application July 13, 1949, Serial No. 104,453, now Patent No. 2,661,818, dated December 8, 1953. Divided and this application December 28, 1951, Serial No. 263,891

12 Claims. (Cl. 188—59)

This invention relates to railway brake equipment and more particularly to a novel off-wheel brake arrangement wherein braking means are provided for decelerating one or more disks or rotors associated with the wheel and axle assemblies of a railway car truck. This application is divided out of my co-pending application, Serial No. 104,453, filed July 13, 1949, now Patent No. 2,661,818.

The general object of the invention is to devise an off-wheel brake arrangement wherein brake disks are supported to rotate with each wheel and axle assembly, and a brake frame is carried by the truck frame adjacent each disk, each brake frame supporting a pair of levers with brake shoes for frictional engagement with opposite sides of the adjacent disk.

Another object of the invention is to provide a mounting arrangement for the brake frame which is simple to assemble and disassemble and wherein the parts cooperate to maintain the brake frame, and thus the brake shoes carried thereby, in proper position with respect to the related disk.

A different object of the invention is to design a braking arrangement incorporating novel means for guiding the brake shoes with respect to the related disks and cooperating with the brake frame mounting to effect a satisfactory braking application.

These and other objects of the invention will become more apparent from the specification and drawings, wherein.

In each of said views certain details may be eliminated where more clearly seen in other views.

Figure 1:
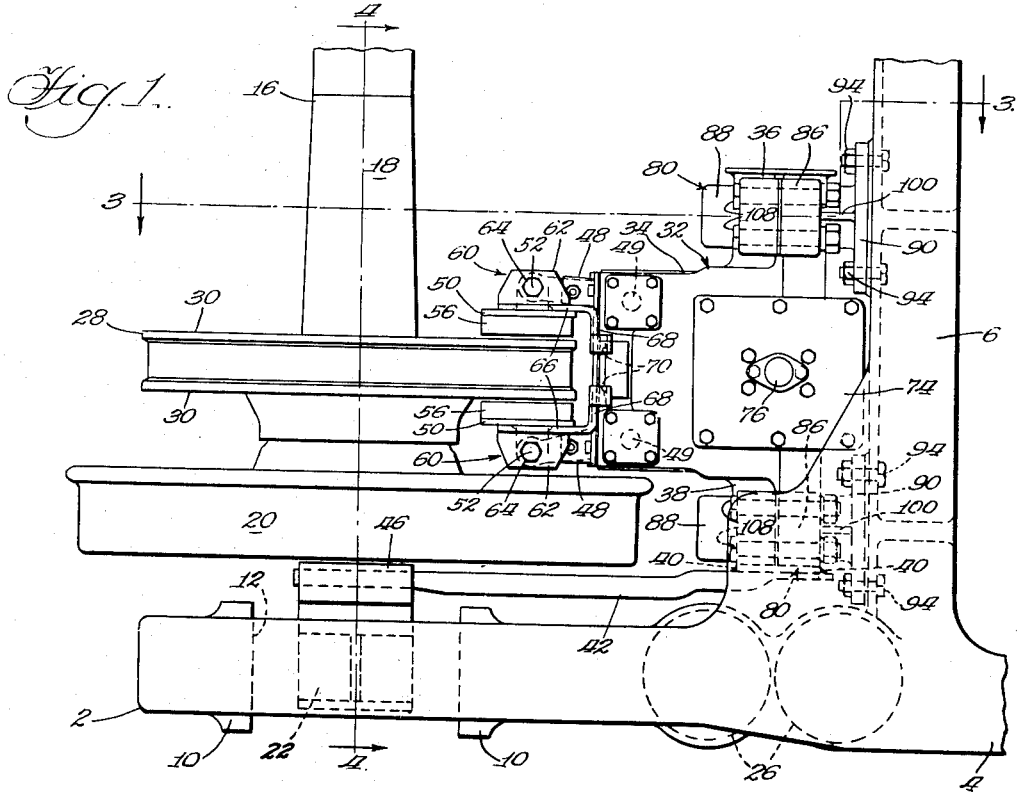
Figure 1 is a top plan view of a railway car truck incorporating the invention, only one-quarter of the truck being shown inasmuch as it is substantially identical at opposite sides and opposite ends thereof.
Figure 2:
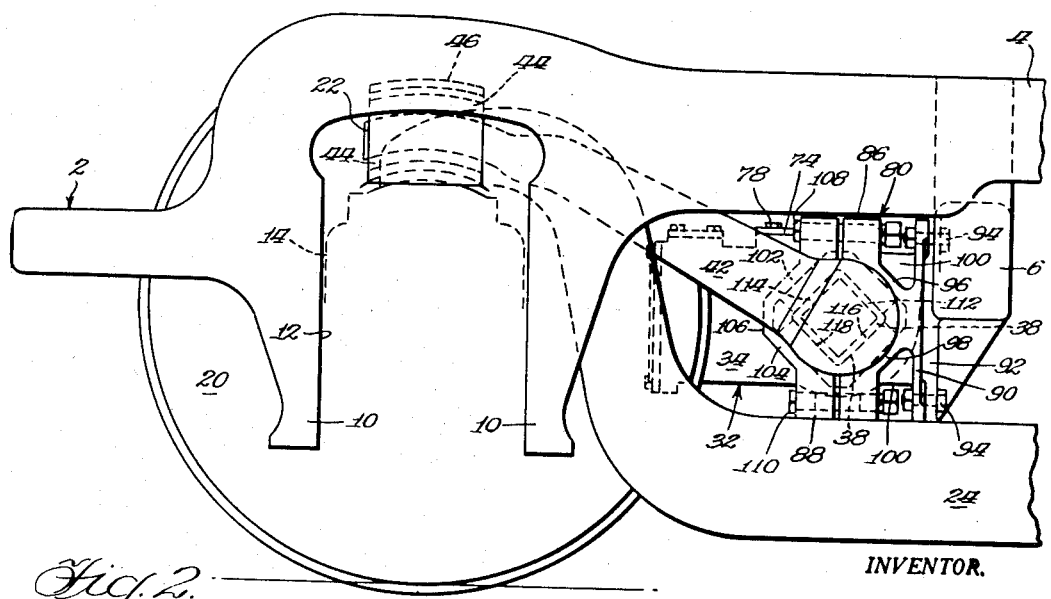
Figure 2 is a side elevational view of the structure shown in Figure 1.

Describing the invention in detail, the truck frame 2 comprises a side rail 4 at each side of the longitudinal center line of the truck and a transom 6 disposed at each side of the transverse center line of the truck, the transoms affording a means of connection to an associated bolster (not shown), said bolster affording support for the car body, as well understood in the art. Each end of each side rail 4 is provided with spaced pedestal jaws 10, 10 defining a pedestal opening 12, as best seen in Figure 2, each pedestal opening 12 receiving the associated journal box 14, fragmentarily illustrated in Figure 2, said journal box supporting the journal end of the associated wheel and axle assembly 16, said assembly comprising an axle 18 and a wheel 20 adjacent each end of the axle. On each journal box 14 is positioned an equalizer seat 22 affording positioning means for an equalizer 24. The truck frame is afforded a conventional resilient support from the equalizers by means of spring 26 diagrammatically shown in Figure 1.

A disk or rotor 28 is secured as by stud and nut assemblies 29 to each wheel 20 and presents friction surfaces 30, 30 at opposite sides thereof.

Figure 3:
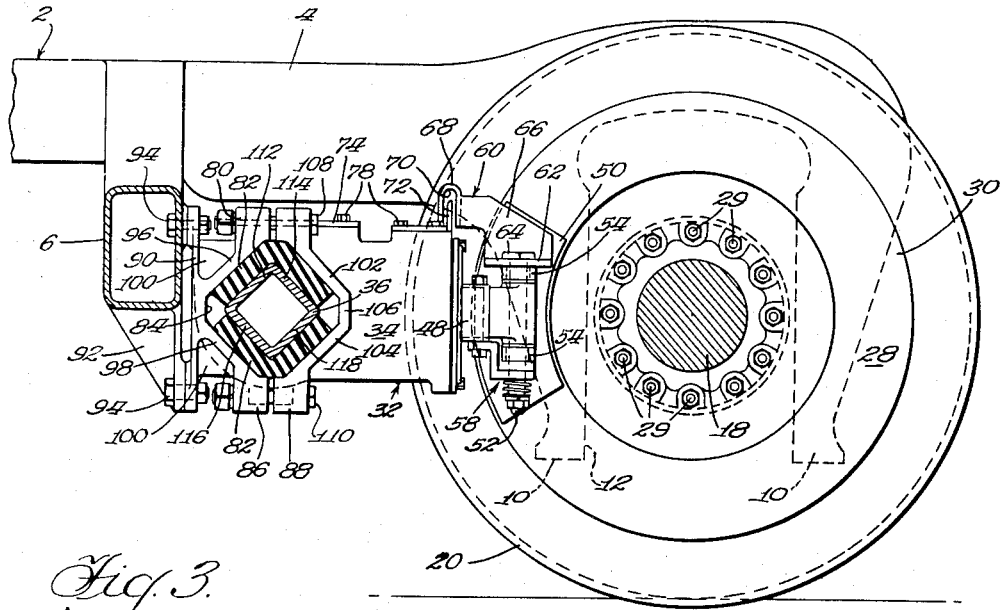
Figure 3 is a sectional view of the truck and brake arrangement taken substantially in the vertical longitudinal plane as indicated by the line 3—3 of Figure 1.
Figure 4:
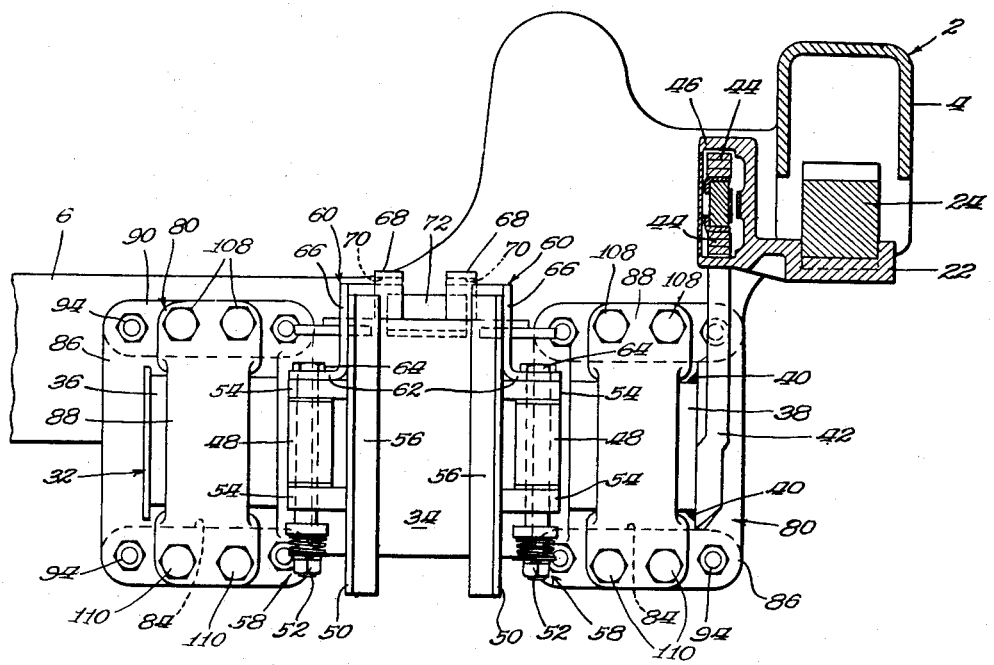
Figure 4 is a sectional view taken substantially in the transverse vertical plane as indicated by the line 4—4 of Figure 1 with the wheel and axle assembly removed to more clearly illustrate the invention.

The braking means for the rotor 28 comprises a brake frame, generally designated 32, including a body portion 34 forming a cylinder housing, the body portion being provided with coaxial inboard and outboard trunnion extensions 36 and 38, the axis of which is disposed in horizontal alignment with the axis of assembly 16. The outboard end of extension 38 is connected as by welding at 40, 40 to a torque arm 42 clamped between spaced resilient means 44, 44 received and retained within a jaw 46 on the adjacent equalizer seat 22. A pair of levers 48, 48 are pivoted as at 49, 49 within the body portion 34 and project through the forward end of the housing at opposite sides of the rotor 28. A brake head 50 is pivoted on a substantially vertical axis to the outer end of each lever 48 as by a pin or bolt 52 extending through aligned openings in the lever and spaced lugs 54, 54 of the head. Each head 50 carries a brake shoe or stator 56 for engagement with the adjacent surface 30 of the rotor 28. Balancing means, generally designated 58, are provided, cooperating with the associated bolt 52 for resisting rotation of the brake heads. Each bolt 52 also secures a guide 60 to the associated brake head, the guide comprising a substantially horizontal mounting portion or flange 62 which is sleeved over the associated pin and retained in assembled relationship with the brake head 50 between the head 64 of the pin and the upper brake head lug 54, as best seen in Figures 3 and 4. A vertical arm 66 is provided integral with the inner end of the mounting portion 62 and seats against the back of the related brake head 50, said arm 66 extending radially with respect to the associated brake head toward the body portion 34 of the brake frame. The outer end of the arm 66 is provided with a transverse guide portion 68 extending around the rear side of the associated brake head and shoe, said guide portion being shaped in the form of an inverted U to define a guide channel 70, as best seen in Figure 3, receiving an upright guide tongue or web 72 formed as an integral part of the top wall of the body portion 34 of the brake frame and extending transversely thereof along its forward edge substantially parallel to the vertical axial plane of bolts 52. It will be noted that the guide portion 68 is spaced at opposite sides from the tongue 72 to accommodate movement of the brake head assemblies toward and away from the rotor 28. The guide means, however, limit rotation of the brake heads on the pins 52 to prevent the shoes from being applied at a substantial angle with respect to the surfaces 30, 30 of the brake rotor and wearing away diagonally. It will be understood that the brake levers 48, 48 are actuated to apply the shoes to the rotor by power means or an air cylinder (not shown) within the housing, as is conventional practice, the cylinder being secured to a cover plate 74 provided with a nozzle 76 affording convenient attaching means for a fluid supply line (not shown). The cover plate 74 is secured to the top side of the housing 34 as by bolts 78.

The brake frame 32 is resiliently connected to or supported from the truck frame in any convenient manner, as for example, by means of brackets, generally designated 80, 80, and resilient bushings 82, 82 interposed between the brackets 80 and the respective trunnion extensions 36 and 38. It will be noted that each extension 36 and 38 is nonround, as best seen in Figure 3, and, as shown, is preferably square in cross section with diagonally opposed corners thereof at the top and bottom thereof. Each trunnion extension is received within a substantially square socket or opening 84 defined by jaws or clamps 86 and 88 of the associated bracket 80. Jaw 86 is provided with a substantially vertical mounting wall 90 secured to the adjacent transom and bracket 92 thereon as by bolts 94, 94. The jaw 86 (Figures 2 and 3) comprises upper and lower webs 96 and 98 disposed substantially at right angles to each other and connected to the mounting wall 90 intermediate the ends thereof. The connections between webs 96 and 98 and wall 90 are reinforced by gussets 100. The jaw 88 is provided with upper and lower webs 102 and 104 disposed substantially at right angles to each other and connected to each other as at 106. The upper ends of walls 96 and 102 extend generally vertically and are interconnected as by bolts 108, 108 and the lower ends of walls 98 and 104 extend generally vertically and are interconnected to each other as by bolts 110, 110. The upper bushing 82 is disposed between walls 96 and 102 and the walls 112 and 114 of the associated brake frame extension, and the lower bushing 82 is compressed between walls 98 and 104 and walls 116 and 118 of said extension. It will be understood that by tightening the bolts 108 and 110, the desired compression of the bushings 82, 82 is obtained.

I claim:

1. In a brake arrangement, a wheel and axle assembly including an element with radial braking faces on opposite sides thereof, a frame supported adjacent said element, brake means including a pair of levers carried by said frame and disposed at opposite sides of said element, a stator at each side of said element adapted for engagement with the adjacent face, a bolt connecting each stator to the adjacent lever accommodating rotation of the former on a substantially vertical axis, the axes of rotation of said stators being aligned transversely of said faces, a guide member on each stator connected thereto by the associated bolt, each member comprising an arm seated against the side of the associated stator remote from said element and extending substantially parallel to the plane thereof, means on said frame presenting guide surfaces extending substantially parallel to the plane of said axes, and an extension on the end of the arm of each member remote from the associated stator extending transversely thereof, each extension having a U-section portion defining a slot receiving said last mentioned means therein and presenting substantially parallel sides engageable with said surfaces for guiding the related stator with respect to the adjacent braking face.

2. In a brake arrangement, a truck frame, spaced brackets carried thereby, a wheel and axle asembly including radially extending friction faces rotatable therewith, brake means adapted for braking cooperation with said surfaces, a brake frame supporting said brake means, and means for positioning said brake means radially and transversely with respect to said surfaces to obtain substantially full face engagement therebetween and comprising an adjustable connection between each bracket and the brake frame for supporting the latter and shifting the same with the brake means carried thereby to position the brake means with respect to said surfaces and interengaging guide means on said brake frame and said brake means for positioning and guiding said brake means transversely with respect to said surfaces.

3. In a brake arrangement for a railway car truck comprising a wheel and axle assembly and a truck frame spring-supported therefrom, a brake frame supported from said truck frame, a friction element rotatable with said assembly, brake means carried by said brake frame including a plurality of levers disposed at opposite sides of said element, stator means disposed at opposite sides of said element and adapted for braking engagement therewith and pivotally connected to the adjacent of said levers, a guide member connected to each of said stator means, and guide means on said brake frame cooperating with both of said guide members for controlling pivotal movement of said stator means and thus guiding the same with respect to said element.

4. In a brake arrangement for a railway car truck, a wheel and axle assembly including a friction element rotatable therewith, a truck frame resiliently supported from said assembly, a brake frame supported from said truck frame comprising a body portion disposed in radial alignment with said element longitudinally of said truck, brake means carried by said brake frame including a brake head assembly pivoted on a substantially vertical axis for engagement with said element, and means for controlling pivotal movement of said brake head assembly with respect to said element comprising rigid means directly connected to said brake head assembly, and guide means on said body portion guidingly cooperating with said rigid means.

5. In a brake arrangement for a railway car truck a wheel and axle assembly including a friction element rotatable therewith, a support structure, brake means carried by said structure including a pair of levers disposed at opposite sides of said element, a brake shoe pivotally connected to each lever and adapted for braking cooperation with the adjacent side of said element, a guide member operatively associated with each shoe for movement therewith, and guide means on said structure in tongue and groove engagement with each member and formed and arranged to control pivotal movement of the shoes with respect to the related lever and the element.

6. In a brake arrangement, a wheel and axle assembly, a support structure including a substantially vertical tongue member, a friction element disposed in a plane extending transversely of said tongue member and rotatable with said assembly, brake means carried by said structure including a pair of levers disposed at opposite sides of said element, a brake head and friction shoe assembly disposed at each side of said element and pivotally connected to the adjacent lever for rotation relative thereto, a guide connected to each assembly and including a channel-shaped portion providing a slot receiving said tongue member therein.

7. In a brake arrangement for a railway car truck comprising a truck frame and a supporting wheel and axle assembly, a friction element carried by said assembly for rotation therewith, a brake frame supported from said truck frame, brake means carried by said brake frame and comprising a pair of levers disposed at opposite sides of said element, friction assemblies pivotally carried by said levers for engagement with respective sides of said element, and distinct interengaging guide means interconnecting the brake frame and each friction assembly for controlling pivotal movement of the latter with respect to said element.

8. In a brake arrangement for a railway car truck, a wheel and axle assembly including a friction element rotatable therewith, a support structure, brake means carried thereby including stators disposed at opposite sides of said element for engagement therewith and pivotal on substantially vertical axes, and means for controlling pivotal movement of said stators with respect to said element comprising a guide surface on said structure fixed relative thereto and substantially parallel with the plane of said axes and means movable with said stators formed and arranged to cooperate with said surface.

9. In a brake arrangement for a railway car truck comprising a wheel and axle assembly including a friction element rotatable therewith, a support structure, brake means carried by said structure including brake levers, stator means disposed at opposite sides of said element and movably mounted on the levers for braking cooperation with the element, and means connected to said stator means for movement therewith, and guide means on said structure fixed relative thereto and cooperating with said last mentioned means for guiding said stator means with respect to said element and said levers.

10. In a brake arrangement for a railway car truck, a wheel and axle assembly including a friction element rotatable therewith, a support structure, movable brake means carried thereby including a pivotally movable shoe for engagement with said element, and interengaging means connected to and movable with said shoe and rigidly fixed to said structure for controlling pivotal movement of said shoe.

11. In a brake arrangement, a wheel and axle assembly including a friction element rotatable therewith, a support structure, movable brake means carried thereby and including pivotally mounted shoes disposed at opposite sides of said element for braking engagement therewith, and interengaging means fixed relative to said structure and mounted directly on said shoes and movable therewith for guiding said shoes with respect to said element.

12. In a brake arrangement for a railway car truck, a wheel and axle assembly, a truck frame carried thereby, a friction surface rotatable with the assembly, friction means movably carried by the frame and having a surface thereon engageable with the first mentioned surface, a guide member mounted directly on said means movable therewith relative to the frame, and another member carried by the frame and fixed relative thereto and cooperatively engaging the first mentioned member whereby the second mentioned surface is maintained in parallel relation with the first mentioned surface during movement of said friction means.

References Cited in the file of this patent
UNITED STATES PATENTS

| | | |
|---|---|---|
| 2,320,086 | Ledwinka | May 25, 1943 |
| 2,383,376 | Goenssle | Aug. 21, 1945 |
| 2,423,694 | Eksergian et al. | July 8, 1947 |
| 2,527,072 | Pogue | Oct. 24, 1950 |